United States Patent
Abe et al.

(10) Patent No.: US 9,575,644 B2
(45) Date of Patent: Feb. 21, 2017

(54) DATA VISUALIZATION

(71) Applicant: INTERNATIONAL BUSINESS MACHINES CORPORATION, Armonk, NY (US)

(72) Inventors: Eduardo Abe, Sunnyvale, CA (US); Julien Carnec, Lesneven (FR); Yves Le Bras, San Francisco, CA (US); David M. Zeleznik, Middletown, CT (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 14/147,644

(22) Filed: Jan. 6, 2014

(65) Prior Publication Data
US 2014/0195967 A1     Jul. 10, 2014

(30) Foreign Application Priority Data

Jan. 8, 2013 (GB) .................................. 1300260.5

(51) Int. Cl.
*G06F 3/0485* (2013.01)
*G06F 3/0488* (2013.01)
*G06F 3/0484* (2013.01)

(52) U.S. Cl.
CPC ........ *G06F 3/0485* (2013.01); *G06F 3/04883* (2013.01); *G06F 3/04842* (2013.01);
(Continued)

(58) Field of Classification Search
CPC . G06F 2203/04806; G06F 2203/04805; G06F 3/04842; G06F 3/04806;
(Continued)

(56) References Cited

U.S. PATENT DOCUMENTS 4,751,507 A * 6/1988 Hama .................... G09G 5/391
                                                    345/661
5,341,466 A * 8/1994 Perlin ................... G06T 3/0025
                                                    345/428
(Continued)

FOREIGN PATENT DOCUMENTS

WO       2012136901 A1     10/2012

OTHER PUBLICATIONS

C. Gutwin et al., "Interacting With Big Interfaces on Small Screens: A Comparison of Fisheye, Zoom, and Panning Techniques", Canadian Human-Computer Communications Society, Proceedings of Graphics Interface, 2004, pp. 145-152.
(Continued)

*Primary Examiner* — Nicholas Ulrich
(74) *Attorney, Agent, or Firm* — Law Office of Jim Boice

(57) ABSTRACT

A graphical processor, method, and/or computer program product controls a display of user controls on a graphical user interface. A display tool displays a screen view of a data image on a display, wherein the screen view includes one or more graphical objects. A magnifier tool displays a zoomed-in view of a portion of the screen view, wherein the zoomed-in view is superimposed on the screen view, and wherein the zoomed-in view remains turned on until turned off by the user. A crosshair tool targets a graphical object in the zoomed-in portion of the view. A decoration tool displays a user control for a targeted graphical object.

19 Claims, 22 Drawing Sheets

(52) U.S. Cl.
CPC .............. *G06F 2203/04805* (2013.01); *G06F 2203/04806* (2013.01)

(58) Field of Classification Search
CPC ........ G06F 3/0485; G06F 17/24; G06T 11/60; G06T 19/20; G06T 2210/12; G06T 2219/2016; H04N 1/00442
See application file for complete search history.

(56) References Cited

U.S. PATENT DOCUMENTS

| | | | |
|---|---|---|---|
| 5,504,853 A * | 4/1996 | Schuur | G06F 3/04845 715/781 |
| 5,615,384 A | 3/1997 | Allard et al. | |
| 5,625,782 A * | 4/1997 | Soutome | G06F 3/0485 345/660 |
| 6,073,036 A | 6/2000 | Heikkinen et al. | |
| 6,359,615 B1 | 3/2002 | Singh | |
| 6,466,203 B2 | 10/2002 | Van Ee | |
| 6,633,305 B1 * | 10/2003 | Sarfeld | G06F 3/0481 345/667 |
| 7,062,723 B2 * | 6/2006 | Smith | G06F 3/0481 715/860 |
| 7,443,396 B2 | 10/2008 | Ilic | |
| 7,831,926 B2 | 11/2010 | Rohrabaugh et al. | |
| 7,889,212 B2 | 2/2011 | Schulz et al. | |
| 8,149,249 B1 | 4/2012 | Oplinger | |
| 8,159,465 B2 | 4/2012 | Stallings | |
| 8,225,225 B2 * | 7/2012 | Jetha | G06F 3/0481 715/769 |
| 8,427,445 B2 * | 4/2013 | Kennedy | G06F 3/0414 345/173 |
| 8,570,346 B2 * | 10/2013 | Mikawa | G06T 3/40 345/629 |
| 9,141,280 B2 * | 9/2015 | Van Eerd | G06F 3/04883 |
| 2001/0012409 A1 | 8/2001 | Watanabe | |
| 2002/0060680 A1 * | 5/2002 | Soohoo | G06T 3/0018 345/428 |
| 2004/0267701 A1 * | 12/2004 | Horvitz | G06F 17/30716 |
| 2006/0026536 A1 | 2/2006 | Hotelling et al. | |
| 2008/0174563 A1 | 7/2008 | Kim | |
| 2009/0070705 A1 | 3/2009 | Ording | |
| 2009/0109243 A1 | 4/2009 | Kraft et al. | |
| 2010/0026723 A1 | 2/2010 | Nishihara et al. | |
| 2010/0115455 A1 * | 5/2010 | Kim | G06F 3/04815 715/781 |
| 2010/0156806 A1 | 6/2010 | Stallings | |
| 2010/0223577 A1 * | 9/2010 | Bennett | G06F 3/0481 715/800 |
| 2010/0275122 A1 | 10/2010 | Buxton et al. | |
| 2010/0302176 A1 | 12/2010 | Nikula et al. | |
| 2010/0302281 A1 | 12/2010 | Kim | |
| 2010/0315438 A1 | 12/2010 | Horodezky et al. | |
| 2011/0010668 A1 | 1/2011 | Feldstein et al. | |
| 2011/0043538 A1 | 2/2011 | Ericson et al. | |
| 2011/0167382 A1 | 7/2011 | Van Os | |
| 2011/0185308 A1 | 7/2011 | Machida | |
| 2011/0209088 A1 | 8/2011 | Hinckley et al. | |
| 2011/0289462 A1 | 11/2011 | Harris et al. | |
| 2013/0050269 A1 * | 2/2013 | Arrasvuori | G06T 3/0025 345/661 |
| 2013/0167070 A1 * | 6/2013 | Tsuda | G06F 3/04845 715/785 |
| 2014/0136972 A1 * | 5/2014 | Rodgers | G06F 17/217 715/274 |
| 2014/0281969 A1 * | 9/2014 | Kumar | G06F 3/0482 715/711 |

OTHER PUBLICATIONS

GB Intellectual Property Office: Search Report for GB Application No. 1300260.5 Mailed July 15, 2013.

\* cited by examiner

Enhanced Data Visualization Module 200

Magnifier tool 202

Highligher Tool 204

Crosshair Tool 206

Decoration Tool 208

Pan Far Tool 212

Pan Collision Tool 214

Zoom Limit Tool 216

Crosshair Tool Tip Tool 218

Off-Screen Highlight Tool 220

Adjacent Element Highlight Tool 222

Double Tap Method 400

Touch-and-Hold Method 500

Tap Method 600

Touch-Move Method 700

Pinch Method 800

FIGURE 3A

Enhanced Data Visualization Method 300

302 Display a screen view of a data image including graphical objects

304 Display a zoomed-in view of a portion of the screen view of the data image superimposed on the screen view whereby the zoomed-in view is turned on and remains on until turned off by user interaction 306 Select a graphical object in the zoomed-in view 308 Display a user control for interaction with the selected graphical object 310 End

FIGURE 3B

| Double Tap Method 400 |
|---|
| Def (Double Tap Method) |
|  if 402 Is MagnifierTool not active? |
|   if 404 Is event.source in the main view? |
|    if 406 Is event.position near MainView.topRegion |
|     408 Show MagnifierTool at MainView.bottomRegion |
|    else |
|     410 Show MagnifierTool at MainView.topRegion |
|    412 Show HighlightArea (Activate highlight area as well) |
|    HighlightArea.highlightElement =event.target |
|    for each interactionController in HighlightArea.highlightElement {show InteractionInputView} |
|   else |
|  else |
|   if 414 event.source == MainView |
|    416 Dismiss the Magnifier Tool and each interaction input views |
|   else |
|   418 Forward event to be handled by the application |
|  420 End of Double Tap Method 400 |

FIGURE 4B

| Touch-And-Hold Method 500 |
|---|
| Def (Touch-And-Hold Method 500)<br>  if 502 MagnifierTool not active AND event.source == MainView ?<br>   503 Activate the Magnifier Tool<br>   if 504 event.position near MainView.topRegion<br>    506 show MagnifierTool at MainView.bottomRegion<br>   else<br>    508 show MagnifierTool at MainView.topRegion<br>   510 Show HighlightArea<br>   512 if [event.target exists]{HighlightArea.highlightElement =event.target; for each interactionController in HighlightArea.highlightElement; show InteractionInputView}<br><br>  else<br>   514 Perform no action and forward event to be handled by the application<br>  516 End of Touch-And-Hold Method 500 |

FIGURE 5B

```
Tap Method 600
Def (Tap Method 600)
 if 602 MagnifierTool active?
  if 604 event.source == MainView?
   606 Dismiss the Magnifier View and interaction input views
   hide MagnifierTool
   hide InteractionInputView
  else if 608 event.source == InteractionInputView?
    610 Activate an interaction controller
    trigger InteractionInputView.controller
  else if 612 HighlightArea.highlightElement exists AND
event.source == HighlightArea OR event.source ==
MagnifierTool?
     618 Trigger the highlight element default action trigger
HighlightArea.highlightElement.default.Action
  else
   620 Perform no action, Forward event to be handled by the
application
 else
  622 Perform no action, Forward event to be handled by the
application
 624 End of Tap Method 600
```

FIGURE 6B

```
Touch-Move Method 700
Def (Touch-Move Method 700)
 if 702 event.source==InteractionInputView
    704 trigger InteractionInputView.controller
 else
   # Touch-move event starts
  if 706 event.move.start exists AND HighlightArea.highlightElement
exists
    708 hide all InteractionInputViews
  if 710 event.source == MainView
    #Pan the main view
    712 pan MainView
  Elif 714 event.source == HighlightArea
    716 pan HighlightArea # Will result in panning the Magnifier Tool
    # Pan the Magnifier Tool by dragging the Highlight Area
    # Uses the coordinate system of the Main View
  Elif 718 event.source == MagnifierTool
    720 pan HighlightArea # Note: no interaction controllers are
active
    # Pan the Magnifier Tool directly
    # Uses the coordinate system from the Magnifier Tool
    # Check and highlight elements under crosshair
  if 722 event.target exists
    724 HighlighArea.highlightElement = event.target
  else
   726 HighlightArea.highlightElement = NULL
 # Touch-move event ends
  if 728 event.move.end exists AND HighlightArea.highlightElement
exists
    # Display interaction input views
    730 show all InteractionInputViews
 732 End of Touch-Move Method 700
```

FIGURE 7B

```
Pinch Method 800
Def (Pinch Method 800)
 if 802 MagnifierTool not active?
  804 Change the main view amplification (zoom level)
  scale MainView by event.scale
 else 806 Change the Magnifier Tool amplification
 scale HighlightArea by event.scale // Will result in changing the
  Magnifier Tool amplification
 808 End
```

FIGURE 8B

DATA VISUALIZATION

This application is based on and claims the benefit of priority from United Kingdom (GB) Patent Application 1300260.5, filed on Jan. 8, 2013, and herein incorporated by reference in its entirety.

BACKGROUND

The present invention relates to a method and apparatus for data visualization. In particular, the present invention is related to visualizing and interacting with two-dimensional (2D) representations of large data sets that are constrained by the limited size and resolution of interactive displays such as computer monitors, mobile device screens and other presentation devices.

The use of visualization techniques to graphically represent large amounts of correlated data in a 2D space is widely adopted in domains that includes, but are not limited to, geo-locating data on a map, drawing schedules on a time line, plotting flow charts, network topologies and so forth. Although every visual representation maps between raw data and the 2D space, some mappings are more efficient than others. Yet, they all are constrained by the device screen in which they are being displayed. Additionally, the larger the data set is, the bigger the corresponding visual model will be.

While technology improvements and mass production make larger computer displays more affordable, portable networked devices with smaller screen real estate are quickly becoming part of people's daily life and an important way to access data while on the go. For those devices, which includes ultralight laptops, slate computers and mobile phones, 2D visual representations may be inefficient and cumbersome to use as the large models have to be highly compressed to fit the smaller screens, which makes it difficult to read and manipulate the data, requiring excessively repetitive transitions between a whole (and compressed) view of the data and a zoomed (and short-sighted) interactive perspective.

SUMMARY

A graphical processor, method, and/or computer program product controls a display of user controls on a graphical user interface. A display tool displays a screen view of a data image on a display, wherein the screen view includes one or more graphical objects. A magnifier tool displays a zoomed-in view of a portion of the screen view, wherein the zoomed-in view is superimposed on the screen view, and wherein the zoomed-in view remains turned on until turned off by the user. A crosshair tool targets a graphical object in the zoomed-in portion of the view. A decoration tool displays a user control for a targeted graphical object.

BRIEF DESCRIPTION OF THE SEVERAL VIEWS OF THE DRAWINGS

Preferred embodiments of the present invention will now be described, by way of example only, with reference to the following drawings in which:

FIG. 3A is a component diagram of the preferred embodiment;

FIG. 3B is a method diagram of the preferred embodiment;

DETAILED DESCRIPTION

Figure 1A:
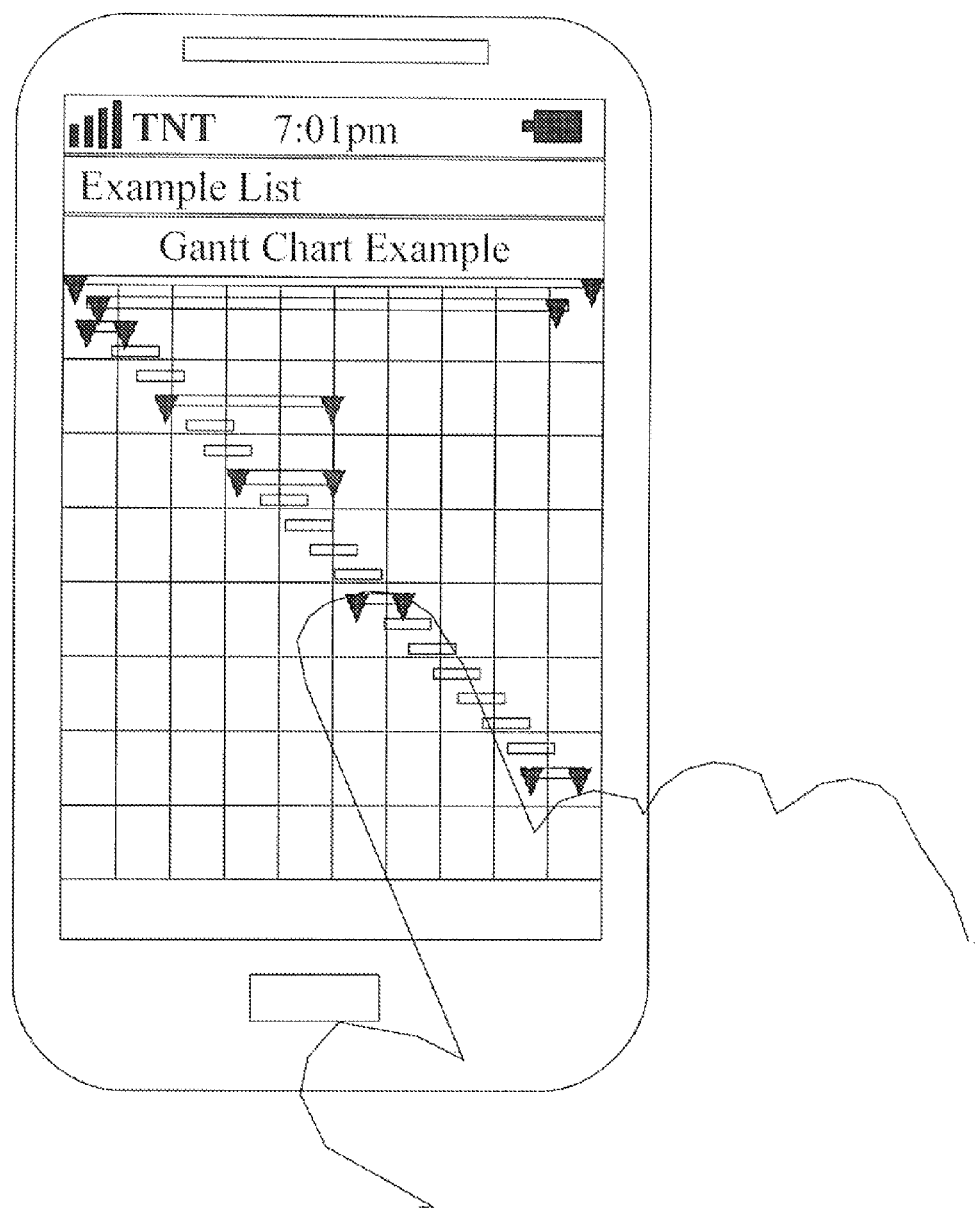
FIG. 1A and FIG. 1B are examples of graphical user interfaces on a mobile device in use for interacting with a data set.
Figure 1B:
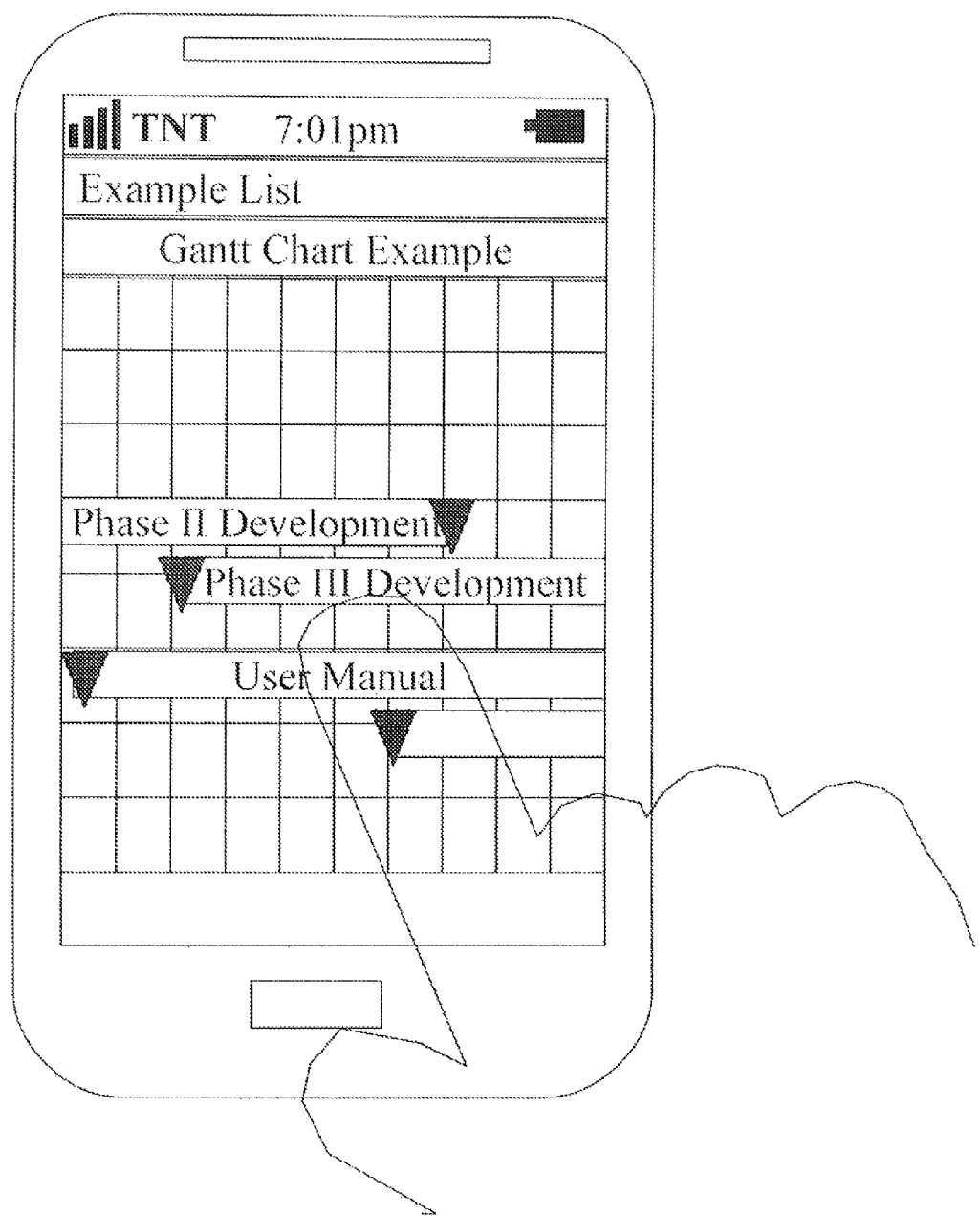

With reference now to the figures, FIG. 1A and FIG. 1B show a relatively simple Gantt-chart rendered on the small screen of a mobile device. A Gantt-chart is used to visually represent resources and activities on a time line using bar charts. FIG. 1A shows the entire visual model (whole view), from which one can perceive the number of different inter-dependencies between the elements despite the compression level of the data; however, interacting with the screen at this magnification level is not precise given the graphic element dimensions relative to the screen size. FIG. 1B shows a zoomed view of the same visual model, from which one can easily read and interact with the labels and other visual decorations. In order to effectively interact with the Gantt-chart, the user must repetitively switch from whole view to zoomed view.

A similar problem can be experienced when rendering an extremely large visual data model on a larger high resolution computer screen.

For related art, the main focus has been given to solutions providing a more precise user experience with touch-sensitive screens. Two distinct categories can be seen in the art: the zooming and the magnifying solutions.

Many of the publications known in the art offer a zoom in/out feature. What is defined as a zoom in/out feature consists in a solution of zooming in and out on the entire display to let the user adapt the zoom level to the precision needed. For example, one example of known prior art describes a personal communicator having improved zoom and pan functions for editing information on touch sensitive display. Another example of known prior art describes a hand-held with auto-zoom for graphical display of Web page. Another example of known prior art describes zooming techniques for touch screens. Another example of known prior art describes a mobile device capable of touch-based zooming and control method thereof. Another example of known prior art describes user interface methods providing continuous zoom functionality.

Other known prior art describes magnifying glass solutions. The distinction between magnifying and zooming in/out solutions is that where a zoom in/out solution applies a zoom level to the entire display, a magnifying glass only offers a zoomed portion on the display and this zoomed portion is always displaying the data located behind the magnifying glass. One example of know prior art in this field describes a mobile station with touch input having automatic symbol magnification function. Another example of known prior art describes an image magnification system for computer interface. Another example of known prior art describes movable magnification icons for electronic device display screens. Another example of known prior art describes an instrument having a virtual magnifying glass for displaying magnified portions of a signal waveform. Another example of known prior art describes magnifying visual information using a center based loupe. Another example of known prior art describes a method of displaying magnified and reduced areas and apparatus thereof. Another example of known prior art describes automatic enlargement of viewing area with selectable objects. Another example of known prior art describes a computing device magnification gesture.

Finally, as the current disclosure targets touch-sensitive screens, one example of known prior art in the field of touch-sensitive screens includes the use of gestures for touch sensitive input devices. Another example of known prior art describes multi-finger gestures. Another example of known prior art describes an electronic device with a touch screen and a method of displaying information.

Figure 2:
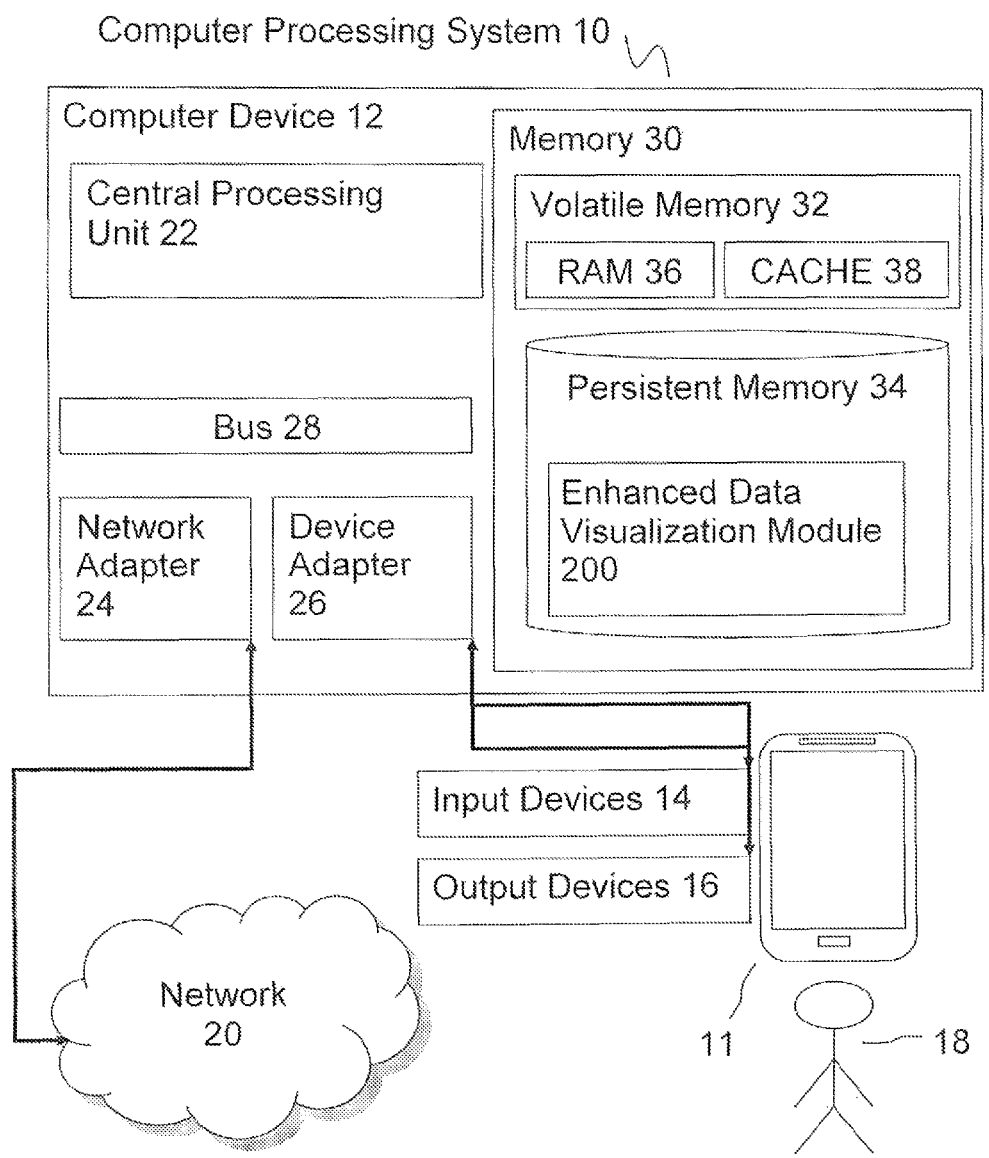
FIG. 2 is a deployment diagram of the preferred embodiment.

Referring now to FIG. 2, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer unit 12 and one or more input devices 14 and output devices 16 directly attached to the computer unit 12. Computer processing system 10 is connected to a network 20. Computer processing system 10 communicates with a user 18 using input devices 14 and output devices 16. Input devices 14 include one or more of: a touch screen; a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

In the preferred embodiment computer processing system comprises portable device 11 with a touch screen display for input and output.

Computer unit 12 comprises: central processing unit (CPU) 22; network adapter 24; device adapter 26; bus 28 and memory 30.

CPU 22 loads machine instructions from memory 30 and performs machine operations in response to the instructions. Such machine operations include: increment or decrement a value in register (not shown); transfer a value from memory 30 to a register or vice versa; take instructions from a different location in memory if a condition is true or false (also known as a conditional branch instruction); and add or subtract the values in two different registers and put the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer unit 12 and network devices.

Device adapter 26 is connected to bus 28 and input devices 14 and output devices 16 for enabling communication between computer unit 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The module configured to carry out the functions of the preferred embodiment comprises enhanced data visualization module 200. Further program modules that support the preferred embodiment but are not shown including firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer unit 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems. In the preferred embodiment, network adapter 24 is a wireless adapter.

Referring to FIG. 3A, enhanced data visualization module 200 comprises: magnifier tool 202; highlighter tool 204; crosshair tool 206; decoration tool 208; pan far tool 212; pan collision tool 214; zoom limit tool 216; crosshair tool tip tool 218; off-screen highlight tool 220; adjacent element highlight tool 222; double tap method 400; touch-and-hold method 500; tap method 600; touch-move method 700 and pinch method 700.

Figure 9:
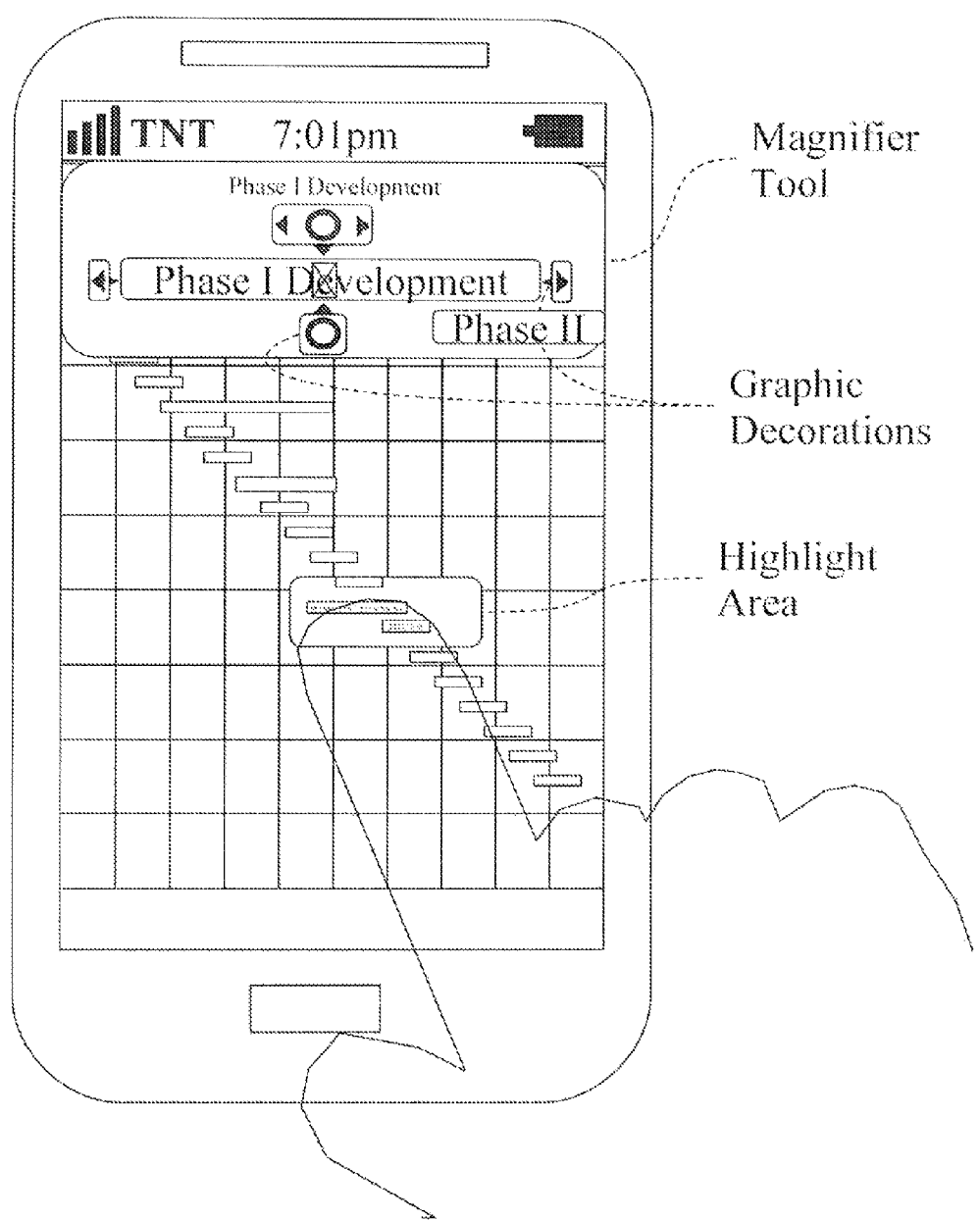
FIG. 9 is an example screen shot of the preferred embodiment.
Figure 10:
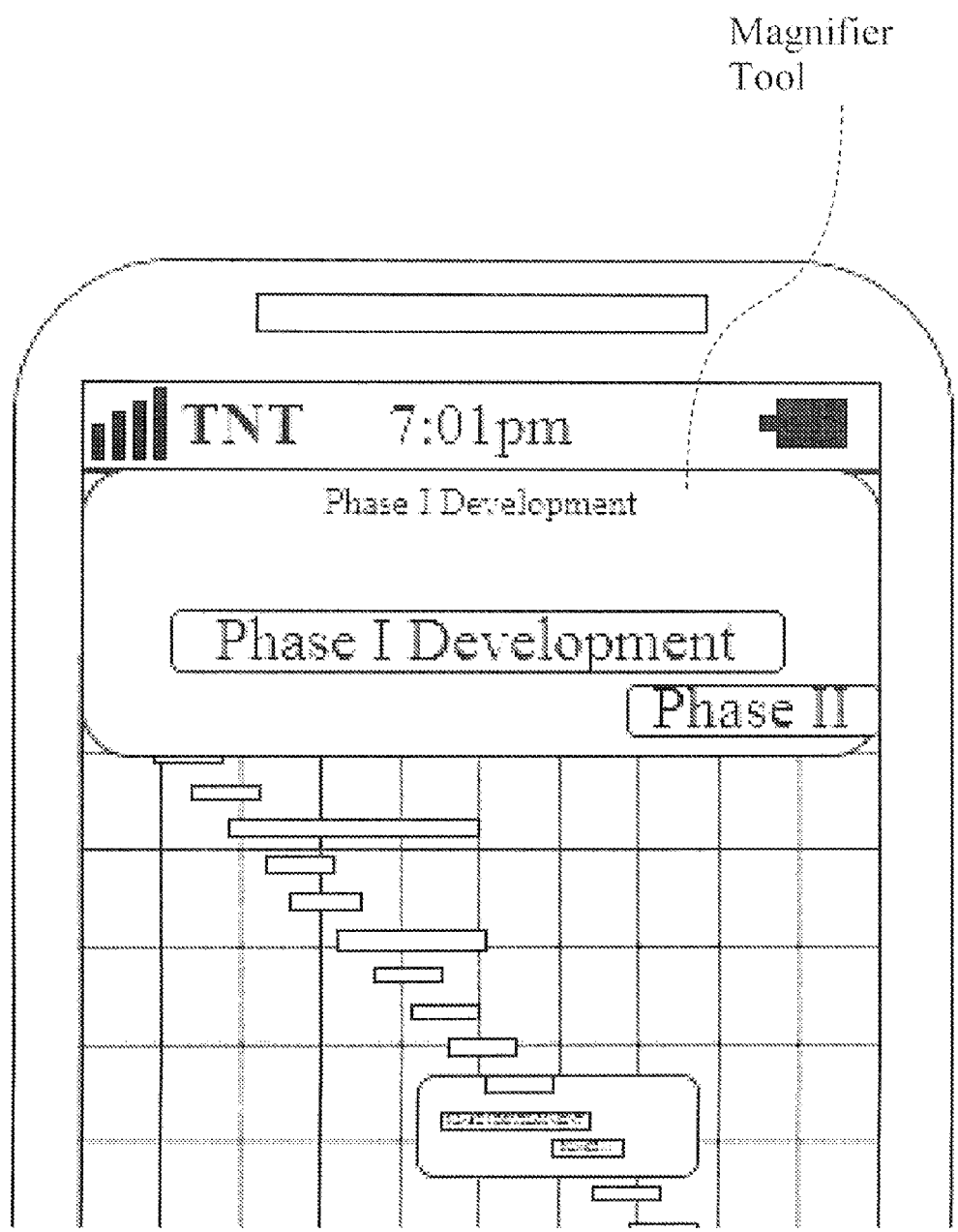
FIG. 10 is an example screen shot of the preferred embodiment identifying a magnifier tool display of FIG. 9.

Magnifier tool 202 is for displaying a portion of the displayed view as a separate zoomed-in portion superimposed on the displayed view adjacent the original portion of the screen as controlled by a user and whereby the separate zoomed-in portion of the view is specifically turned on and remains turned on until specifically turned off by a user. Magnifier 202 is adapted to provide an amplified view of the visual element being manipulated, eliminating the need to switch from whole view to zoomed view. Magnifier tool 202 is based on a standard graphic libraries magnifier visual method that is logically connected to the graphic view to amplify the visual data model. FIG. 9 illustrates the magnified area provided by magnifier tool 202 in the context of a highlighted area and graphic decorations. FIG. 10 illustrates a magnified area in isolation.

Figure 11:
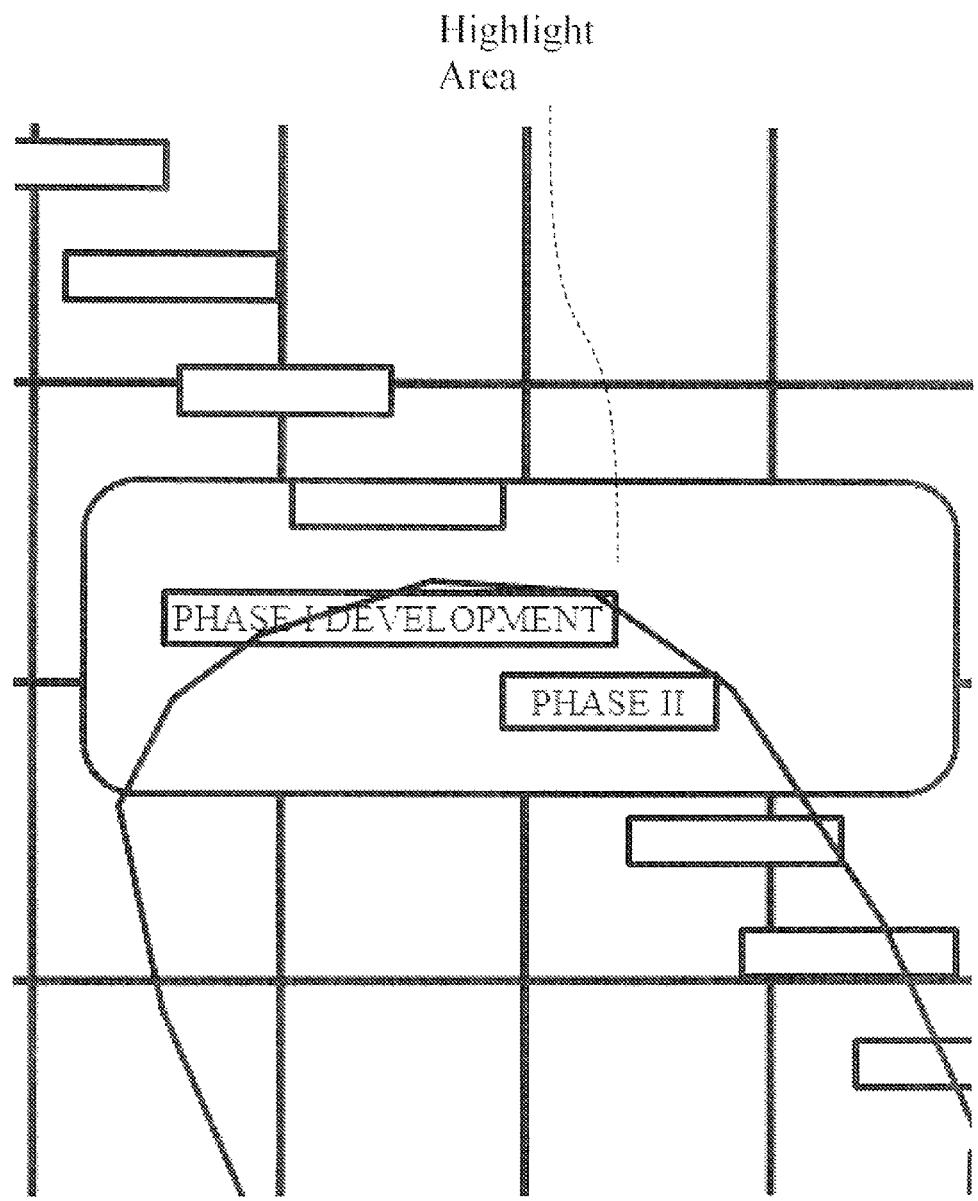
FIG. 11 is an example screen shot of the preferred embodiment identifying a highlight area of FIG. 9.

Highlighter tool 204 is for highlighting the area of the main view corresponding to the area of magnification when the magnifier tool is activated. The highlight area is used by the invention to provide a visual feedback of the magnification level of the magnifier tool, and also to allow the user to pan the magnified area without the need to deactivate and re-activate the magnifier tool. FIG. 9 illustrates the highlighted area in the context of magnifier tool 202 and graphic decorations. FIG. 11 illustrates a highlighted area in isolation. A tap anywhere in the highlight area will only trigger the default action for the object of focus of the crosshair tool 206.

Figure 12:
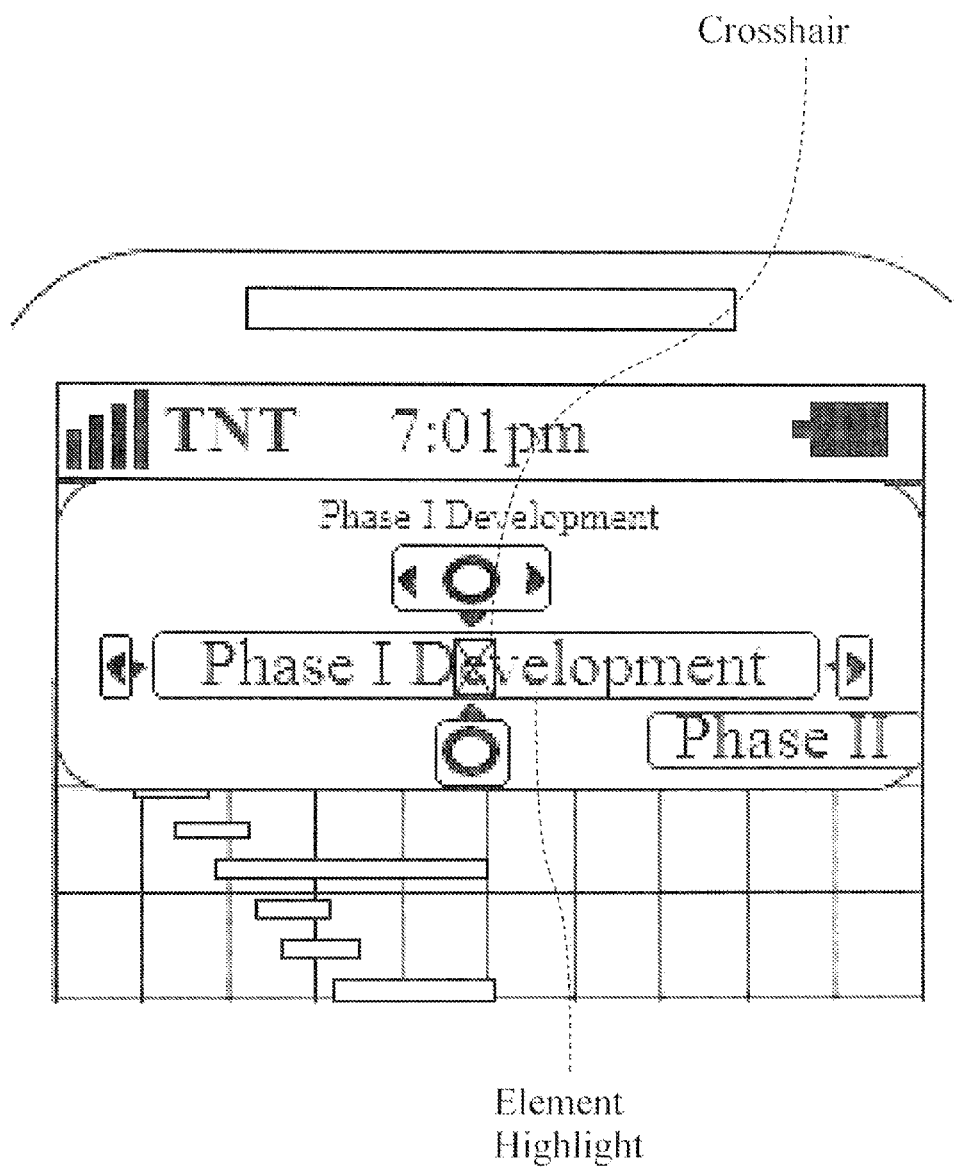
FIG. 12 is an example screen shot of the preferred embodiment identifying a crosshair and element highlight of FIG. 9.

Crosshair tool 206 is for targeting a graphical object in the zoomed-in portion of the view as controlled by the user. The embodiment uses the crosshair to provide visual feedback to where the operation will be performed, allowing maximum precision to the user. At the center of the magnifier tool there is a graphical crosshair that indicates the exact position in the main view where the user is about to perform an interaction. Interactive visual elements under the crosshair are automatically highlighted with visual cue through extra borders around the element boundaries. Element highlighting is used as a visual cue to indicate whether the crosshair is above an interactive visual element. Non-interactive elements are never highlighted. Any interactive visual element underneath the crosshair will be highlighted to indicate an interactive element. FIG. 9 illustrates the graphical crosshair in the context of magnifier tool 202 and graphic decorations. FIG. 12 illustrates an element highlight and a crosshair in isolation. A tap anywhere in the element highlight area will trigger a default action on the object of focus of the crosshair tool 206.

Target predictability of the crosshair tool relies on the visual element currently highlighted. Depending on how the data set has to be compressed in order to fit in the screen, interacting with the main view is unpredictable, especially when the input device is touch-based. The crosshair tool addresses this problem by ensuring that the input event is routed to the highlighted visual element event target before forwarding the event to handlers:
On Input Event:

```
if [ event.source == HighlightArea AND [
HighlightArea.highlightElement exists ] ]
{HighlightArea.highlightElement}
```

Figure 13:
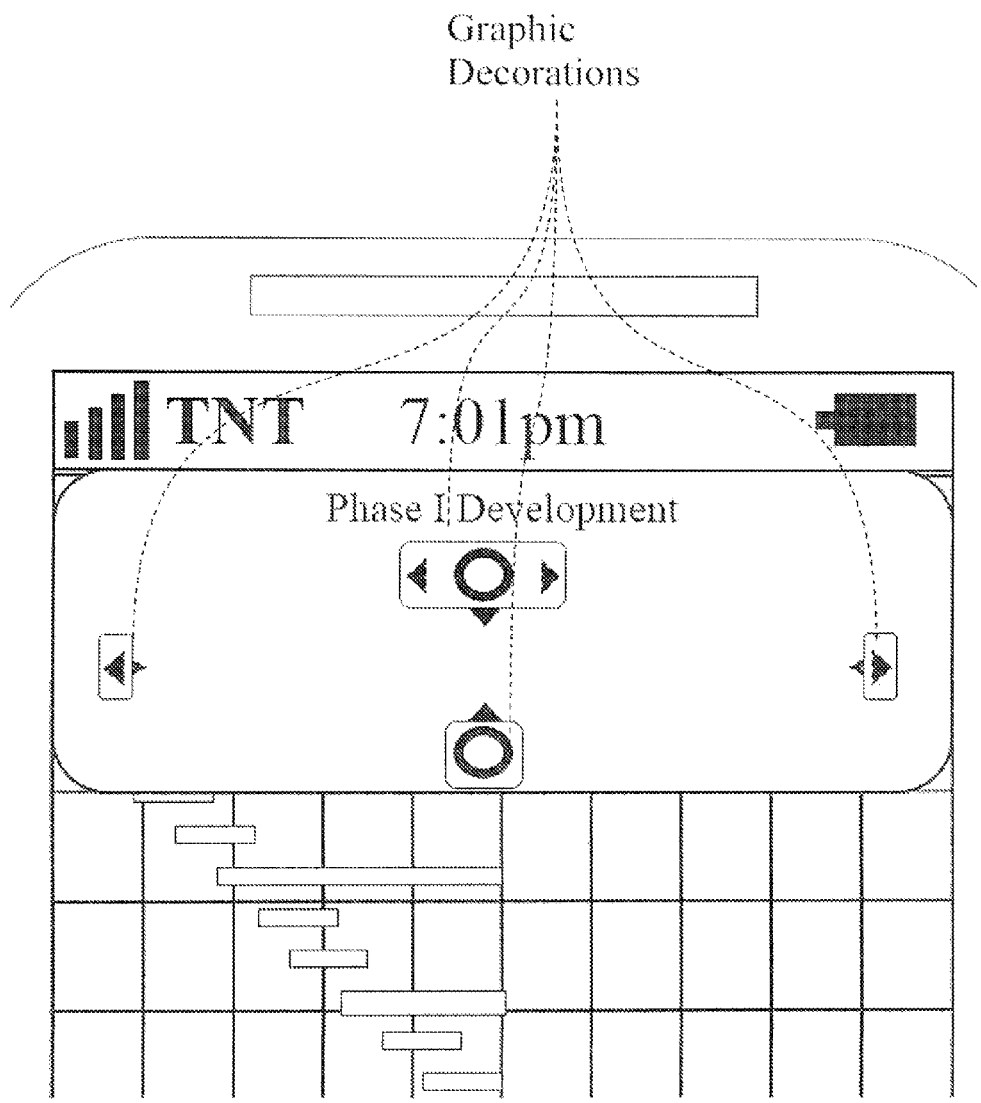
FIG. 13 is an example screen shot of the preferred embodiment identifying graphic decorations of FIG. 9.

Decoration tool 208 is for displaying on the screen further user controls for interaction with the targeted graphical object. A graphic decoration is a visual method to represent attributes of a visual element through attached graphics. Graphic decorations are used to visually represent the interactions available for the element currently highlighted element. Additionally, graphic decorations will act as input views to the interaction controller on the target element. FIG. 9 illustrates graphic decorations in the context of magnifier tool 202. FIG. 13 illustrates graphic decorations in isolation.

Pan far tool 212 is for keeping the magnifier tool active when the user pans the view too far in any direction. The user can pan the view in any direction, moving the highlight area away from the screen but the magnifier tool will still remain active until the user de-activates it.

Pan collision tool 214 is changing the working screen boundaries when the user pans the view towards the magnifier tool. The user can pan the view upwards, moving the highlight area close to the magnifier too, when this scenario happens, the bottom of the magnifier tool is considered to be the top the screen boundaries.

Zoom limit tool 216 is for limiting the scope of zoom to prevent the user zooming in beyond the 1:1 level, or zooming out beyond a certain threshold that depends on the data set domain. The user can use pinch in or pinch out multi-touch events to zoom out or zoom in the magnifier tool, but there are limits.

Crosshair tool tip tool 218 is for positioning the crosshair over any supported visual element such that a tool-tip appears next to the object in the magnifier tool, which is where the user most likely looking at. Some 2D graphic representations support tool-tips, which are small graphic decorations that temporarily appear over certain visible element of interest usually by hovering an input device pointer over it. This makes tool-tips hard to achieve on touch-based devices as the hover concept does not apply.

Off-screen highlight tool 220 is for panning a view off-screen in order to follow an interaction input view that is moved beyond the screen boundaries by a user. Such a beyond boundary movement occurs during a touch-and-move interaction. Some interaction input views will respond to touch and move events (for example a resize controller). When a user touch and moves an interaction input view beyond the screen boundaries the screen will automatically pan towards that direction, and the highlight area will move accordingly.

Adjacent element highlight tool 222 is for moving the highlight area partially off-screen to allow the crosshair to cover the entire visible area thereby highlighting a visual element next to the edge of the main view. Since the crosshair is always at the center of the highlight area, it might be difficult (if not impossible) to position it in a way that the crosshair will be over a small visual element next to the edge of the main view.

Double tap method 400 is for handling double tap events and is described in detail below referring to FIGS. 4A and 4B.

Touch-and-hold method 500 is for handling touch-and-hold events and is described in detail below referring to FIGS. 5A and 5B.

Tap method 600 is for handling tap events and is described in detail below referring to FIGS. 6A and 6B.

Touch-move method 700 is for handling touch-move events and is described in detail below referring to FIGS. 7A and 7B.

Pinch method 800 is for handling pinch events and is described in detail below referring to FIGS. 8A and 8B.

Referring to FIG. 3B, enhanced data visualization method 300 according to the preferred embodiment comprises logical process steps 302 to 308. This method describes the method performed by the enhanced data visualization module 200.

Step 302 is for displaying (by initiating enhanced data visualization module 200) a screen view of a data image including graphical objects.

Step 304 is for displaying (by initiating magnifier tool 202) a zoomed-in view of a portion of the screen view of the data image superimposed on the screen view whereby the zoomed-in view is turned on and remains on until turned off by user interaction Step 306 is for targeting and triggering the default action of a graphical object in the zoomed-in view.

Step 308 is for displaying (by initiating decoration tool 208) a user control for interaction with the targeted graphical object.

Step 310 is the end of enhanced data visualization method 300.

Double tap method 400, touch-and-hold method 500, tap method 600, touch-move method 700 and pinch method 800 are described in detail in terms of flow charts and code used for their embodiment. Some terms need further explanation.

HighlightArea is an object representation of a highlighted area associated with the magnifier view. Whenever magnifier view is active, so is the highlight area. The highlight area is a rectangle in the main view showing the area displayed in the magnifier view.

HighlighArea.highlightElement is an object representation of a visual element that is highlighted by virtue of being under the crosshair in the magnifier view. The crosshair is always in the center on the Magnifier view. To highlight a given element, the user has to pan the magnifier view (or move the highlight area), to have the crosshair positioned on this desired element.

MagnifierTool is an object representation of the magnifier tool.

Event.source is a variable for holding the source properties of a touch event.

Event.position is a variable holding the screen coordinates of a touch event.

InteractionInputViews are object representations of user controllers associated with highlighted elements. Whenever an element is highlighted, any InteractionInputView available is displayed.

Tap events. If an element is highlighted and the user taps the main view then the magnifier view is closed. However, an element is highlighted and the user taps the magnifier view then the default action for the highlighted element is triggered. If the user performs tap on a specific user control (a decoration of the highlighted element), then the action associated with this input view is triggered.

Figure 4A:
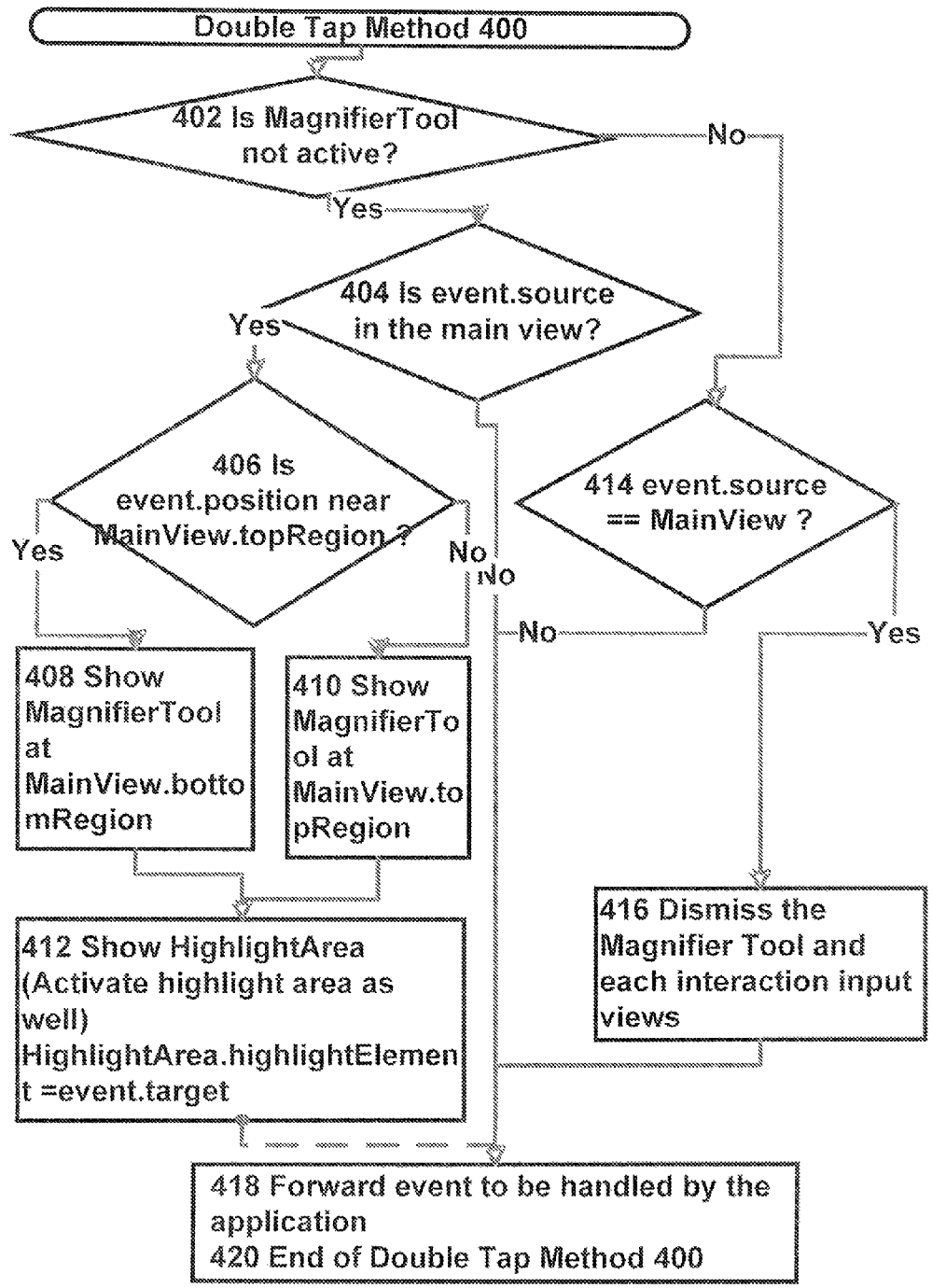
FIG. 4A is a flow diagram for corresponding method instructions FIG. 4B for a double tap event of the preferred embodiment.

Referring to FIGS. 4A and 4B, double tap method 400 is described with a flowchart and corresponding method instructions. Double tap method 400 on double-tap '2×T' event is used in two ways. 1) To activate the magnifier tool 202 and display possible interaction input views as graphic decorations. This will happen when the magnifier tool is not currently active and the user performs '2×T' in the main view. If the touch event happens over a view element, any available interaction input views will be shown. 2) To dismiss magnifier tool 202 and interaction input views. This will happen when magnifier tool 202 is currently active with the user in the main view.

Double tap method 400 defines the behavior to activate the magnifier tool by double taping the main view. This sequence initiates the precision gesture that allows fine operation of small-sized visual elements. Double tap method 400 further defines the behavior for de-activating the magnifier tool by double-tapping the main view while the magnifier tool is active. This sequence ends the precision gesture.

Double tap method 400 comprises logical process steps 402 to 420 as shown in flow diagram of FIG. 4A and as shown in the instruction list of FIG. 4B.

Step 402 is for determining if the magnifier tool is not active. If the magnifier tool is not active (yes) then step 404 and if the magnifier tool is active (no) then step 414.

Step 404 is for determining if the double tap event comes from the main view (event.source=MainView). If yes then step 406 and if no the step 418.

Step 406 is for determining if the double tap event position is near the main view top region (event.position near MainView.topRegion). If yes then step 408 and if no then step 410.

Step 408 is for showing the magnifier tool in the main view at the bottom region (MagnifierTool at MainView.bottomRegion). Next step 412.

Step 410 is for showing the magnifier tool in the top region of the main view (MagnifierTool at MainView.topRegion). Next step 412.

Step 412 is for highlighting the highlight element. Next step 418.

Step 414 is for determining if the double tap event occurs in the main view (event.source==MainView). If yes then step 416 and if no then step 418.

Step 416 is for dismissing the magnifier tool and user controls (InteractionInputViews). Next step 418.

Step 418 is for forwarding the double tap event to the application.

Step 420 is the end of double tap method 400.

Figure 5A:
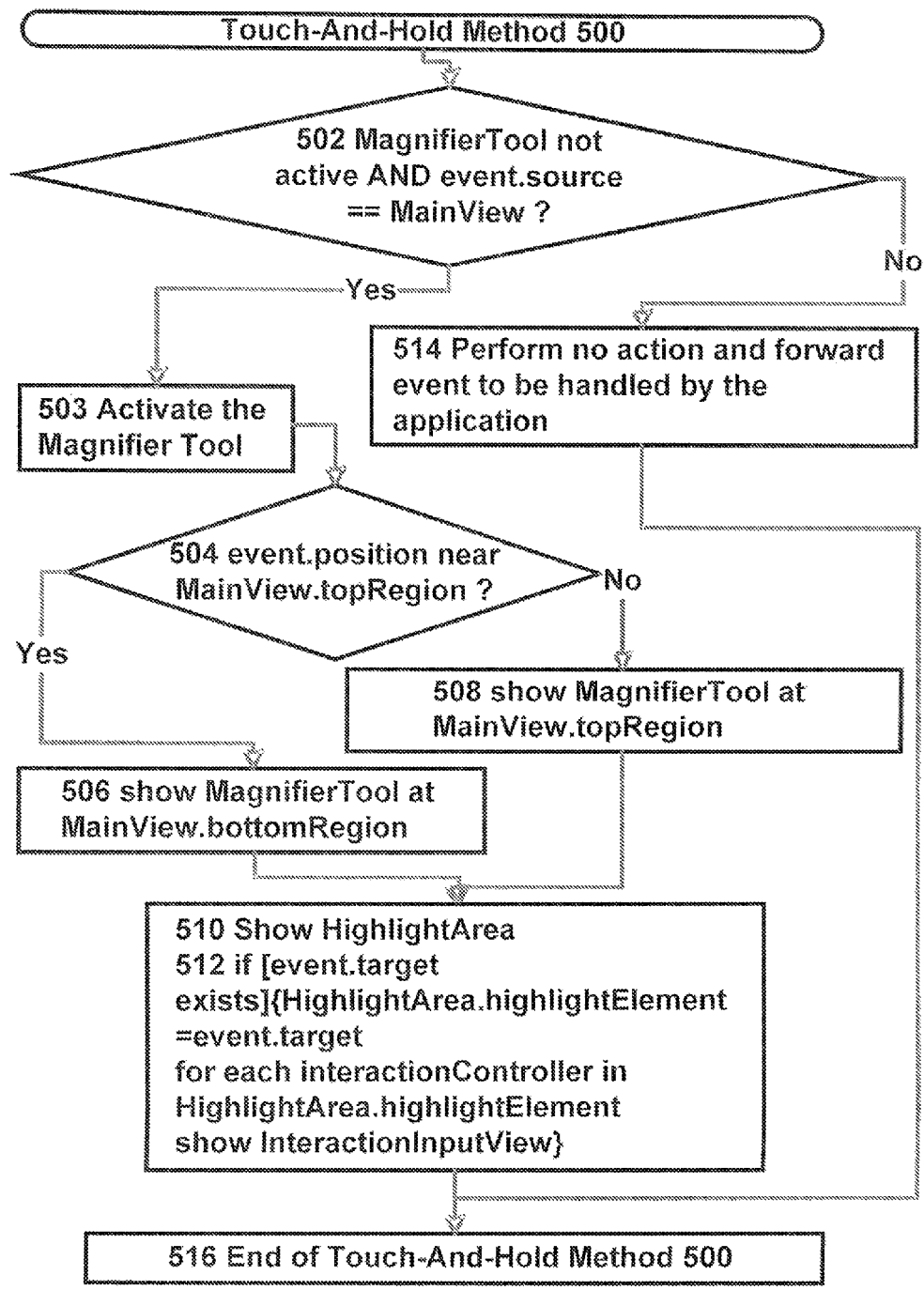
FIG. 5A is a flow diagram for corresponding method instructions FIG. 5B for a touch and hold event of the preferred embodiment.

Referring to FIGS. 5A and 5B, touch and hold method 500 of the preferred embodiment is described in terms of a flow diagram with corresponding method instructions. Touch-and-hold method 500 is a called on occurrence of a 'Touch-and-hold' (TnH) event and is used to activate the magnifier tool 202. This will happen when the magnifier tool 202 is not currently active and the user performs 'TnH' on the main view. Touch-and-hold method 500 defines an alternative way to activate the magnifier tool and initiate the precision gesture by touch and holding the main view. Touch-and-hold method 500 comprises logical process steps 502 to 516.

Step 502 is for determining if the magnifier tool is not active AND if the touch-and-hold event occurs in the main view (event.source==MainView). If yes step 502 and if no then step 514.

Step 503 is for activating the magnifier tool if not active. Next step 504.

Step 504 is for determining if the touch-and-hold event occurs near the top region of the main view (if event.position near MainView.topRegion). If yes then step 506 and if no then step 508.

Step 506 is for showing the magnifier tool in the bottom region of the main view. Next step 510.

Step 508 is for showing the magnifier tool in the top region in the main view. Next step 510.

Step 510 the highlight area is also shown. Next step 512

Step 512 each user control (InteractionInputController) in the highlight area is shown if the event target exists.

Step 514 is for performing no action and forwarding the event to be handled by the application.

Step 516 is the end of touch-and-hold method 500.

Figure 6A:
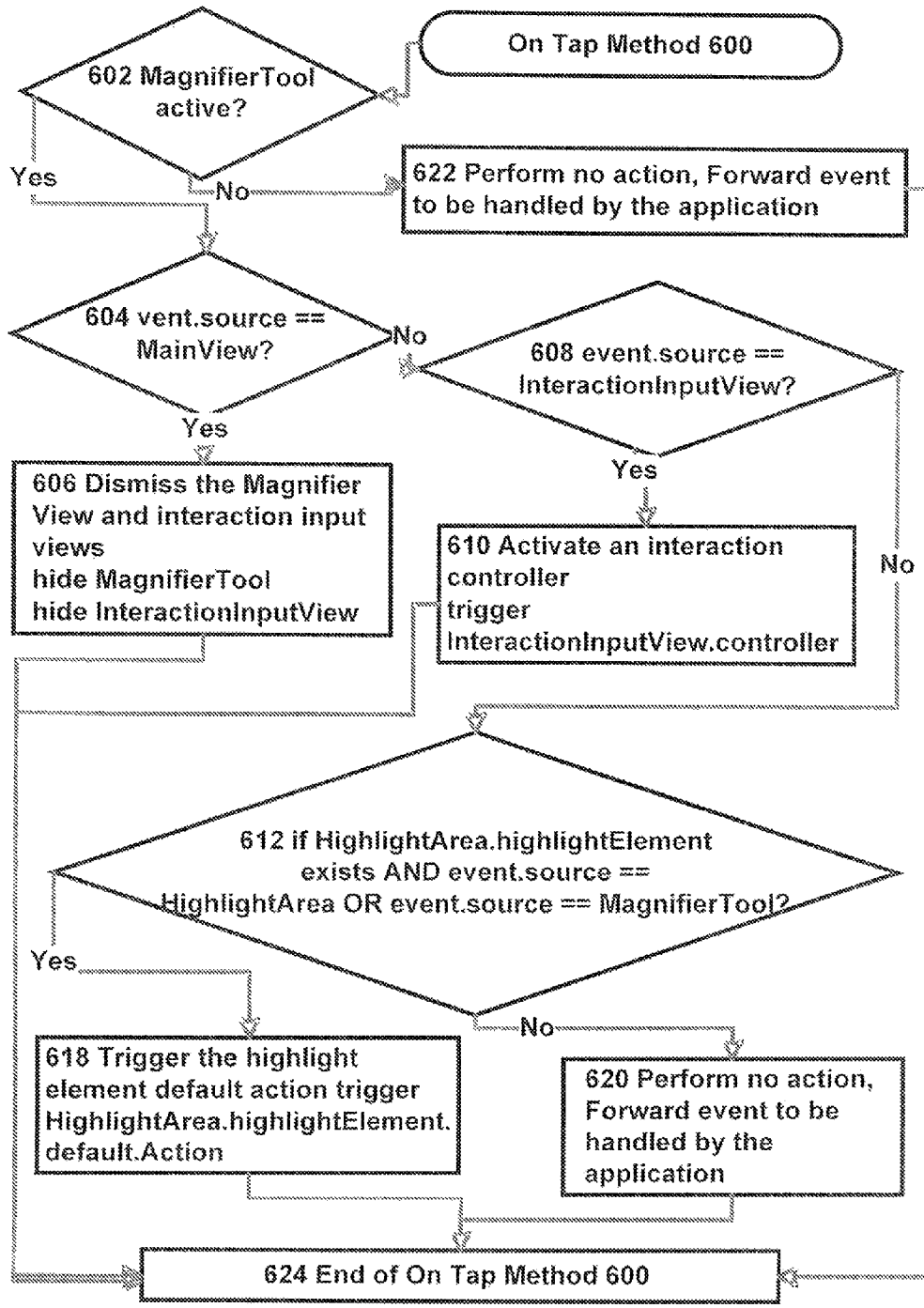
FIG. 6A is a flow diagram for corresponding method instructions FIG. 6B for a single tap event of the preferred embodiment.

Referring to FIGS. 6A and 6B, tap method 600 for a single tap event of the preferred embodiment is described in terms of a flow diagram and corresponding method instructions are shown in FIG. 6B. Tap method 600 is used in three ways. 1.) For dismissing the magnifier view and interaction input views. This will happen when the magnifier tool is active and the user taps the main view. 2.) For activating an interaction controller. This will happen when the magnifier tool is active and the user perform a single tap on an interaction input view next to the highlight area or when the user performs a single tap on an interaction input view in the magnifier tool. 3.) For triggering the default action of a view element. This will happen when the magnifier tool is active and the user taps the highlight area (and there is a highlighted element) or when the user performs a single tap on the highlighted element in the magnifier tool. Tap method 600 comprises logical process steps 602 to 624.

The first part of method 600 defines an alternative way to de-activate the magnifier tool and end the precision gesture by tapping the main view while the magnifier tool is active.

Step 602 is for determining if the magnifier tool is active. If active then step 604 and is not active then step 622.

Step 604 is for determining if the tap event source is from the main view. If yes then step 606 and if no then step 608.

Step 606 is for dismissing the magnifier view and interaction input views by hiding them. Next step 624.

Step 608 is for determining if the event source is in the interactive input view. If yes then step 610 and if no then step 612.

The next part of method 600 defines the behavior to activate an interaction controller of the currently highlighted visual element. It defines that tapping an interaction input view will forward the tap event to trigger the corresponding controller.

Step 610 is for activating an interaction controller trigger. Next step 624.

Step 612 is for determining if a highlight element exists in a highlight area and if the source of the event is the highlight light area or if the event source is the magnifier tool (HighlightArea.highlightElement exists AND event.source==HighlightArea OR event.source==MagnifierTool). If yes then step 618 and if no then step 620.

The last part of the method is for defining behavior to trigger a default action on the currently highlighted visual element by tapping a highlighted object (either on through the magnifier tool or directly in the main view). In common use cases, the default action is the selection, which is a particular type of interaction that adds a visual cue to a visual element (usually a special border) to indicate that it is currently being interacted with.

Step 618 is for triggering the highlight element default action. Next step 624.

Step 620 is for performing no action, for forwarding the event to be handled by the application. Next step 624.

Step 624 is the end of single tap method 600.

Figure 7A:
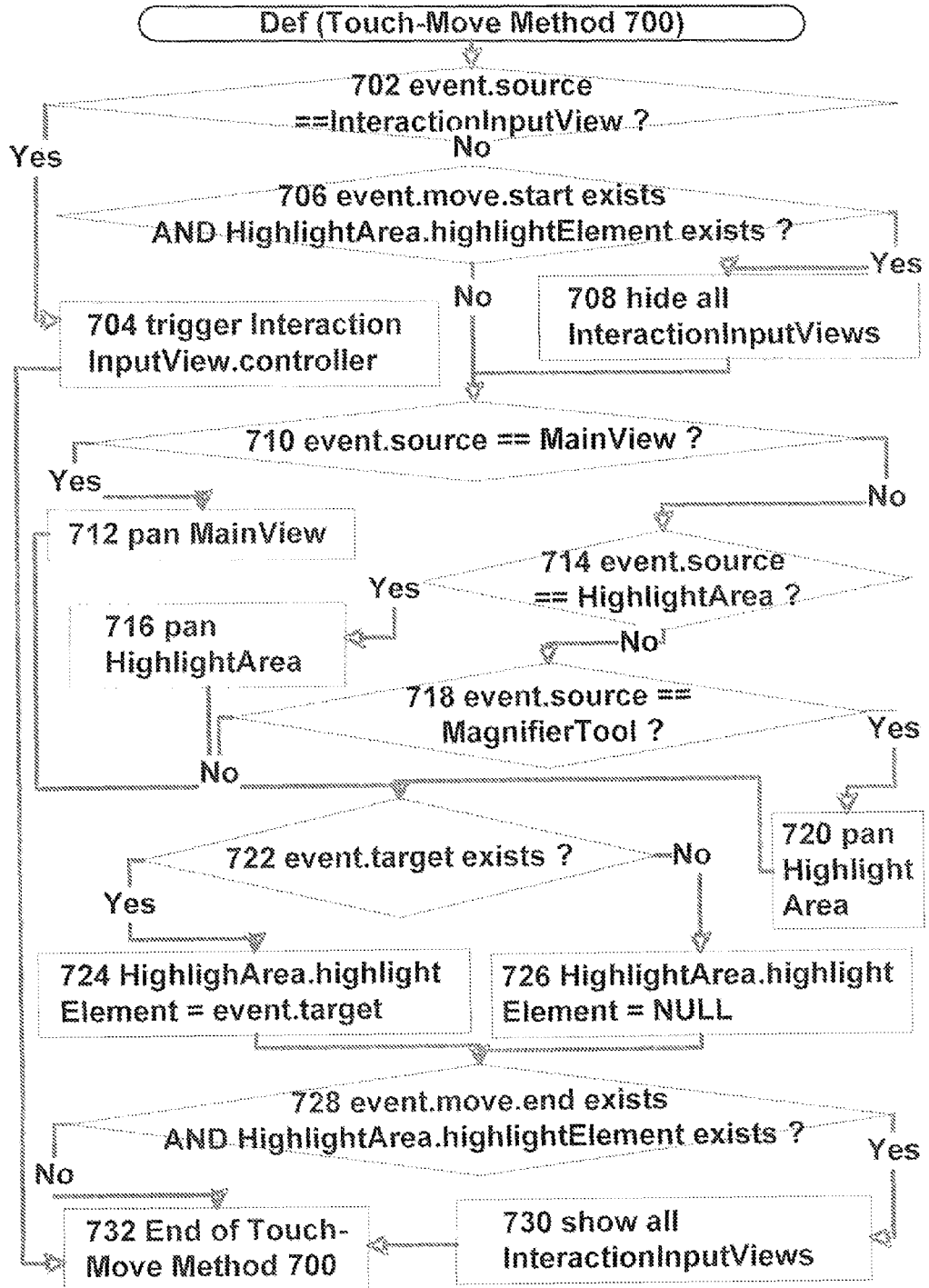
FIG. 7A is a flow diagram for corresponding method instructions FIG. 7B for a touch move event of the preferred embodiment.

Referring to FIGS. 7A and 7B, touch-move method 700 is described in terms of a flow diagram with corresponding method instructions. Touch-move method 700 and 'Touch-move' (TMV) event is used in three ways. 1) For panning the main view. This will happen when the user performs TMV on any region of the main view, regardless of whether the magnifier view is active or not, and will cause the main view to pan its contents following the touch movement. 2) For dragging the highlight area. This will happen when the user performs TMV on the highlight area and will cause the magnifier tool to pan its contents following the touch movement. This will also happen when the user performs TMV on the magnifier tool. 3) For activating an interaction controller. This will happen when the user performs TMV on an interaction input view next to the highlight area or when the user performs TMV on an interaction input view in the magnifier tool. Touch-move method 700 comprises logical process steps 702 to 732.

The first part of method 700 defines behavior to pan the main view by touch and move. Panning the view allows for adjustments when, for example, the user is interacting with a visual element near the edge of the screen.

Step 702 is for determining if the touch move event occurs on a user controller (InteractionInputView). If yes then step 704 or if no then step 706

Step 704 is for triggering that user controller and completing the method at step 732.

Step 706 is for determining if the touch move event has started moving AND if a highlight element exists. If yes then step 708 or if no then step 710.

Step 708 is for hiding all the user controls. Next step 710.

Step 710 is for determining if the touch move event occurs in the main view and if so step 712. If not, then step 714.

Step 712 is for panning the main view. Next step 722.

Step 714 is for determining if the touch move event is on the highlight area and for proceeding to step 716 if so. If the touch move event is not on the highlight area then step 718.

Step 716 is for panning the highlight area. Next step 722.

Step 718 is for determining if the event source is the magnifier tool and for proceeding to step 720 if so. If not then step 722.

Step 720 is for panning the highlight area. Next step 722.

Step 722 is for determining if the event target exists and continuing to step 724 if so. If the event target does not exist then next step 726.

Step 724 is for setting the highlight element as the event target. Next step 728.

Step 726 is for setting the highlight element as null. Next step 728.

Step 728 is for determining if event move has ended AND is the highlight element exists and proceeding to step 730 if so. If not then step 732.

Step 730 is for showing all the user controls (InteractionInputViews).

Step 732 is the end of touch-move method 700.

Figure 8A:
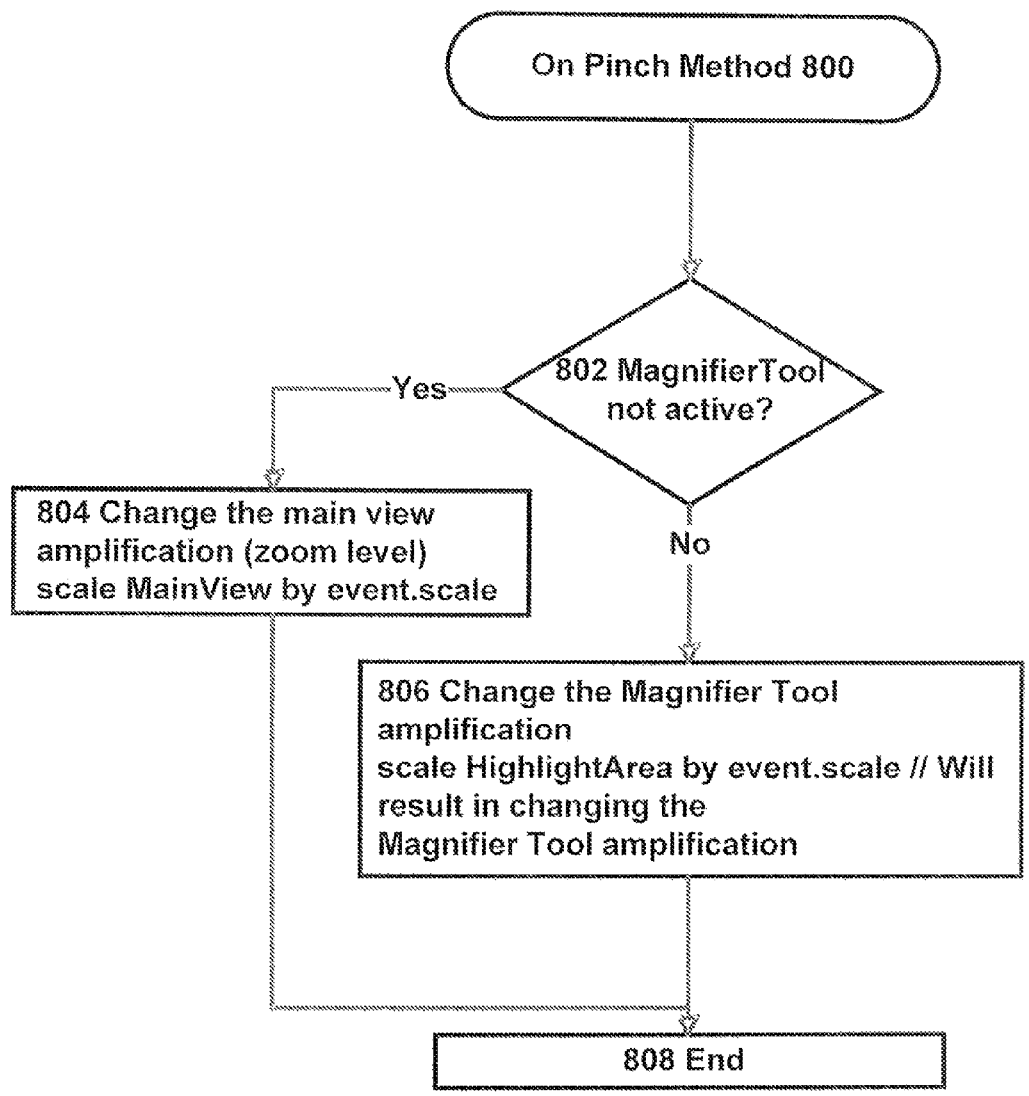
FIG. 8A is a flow diagram for corresponding method instructions FIG. 8B for a pinch event of the preferred embodiment.

Referring to FIGS. 8A and 8B, pinch method 800 is described in terms of a flow diagram with corresponding method instructions. Pinch method 800 on a 'Pinch' (PIN) event is used in two ways. 1) For zooming (in or out) on the main view. This will happen if the magnifier tool is not active and the user performs PIN on the main view. 2) For changing (increase or decrease) the magnifier tool amplification. This will happen if the magnifier tool is active and the user performs PIN on the main view or the magnifier tool.

The first part of the method defines the behavior to change the magnification level of the main view by pinching in or pinch out the screen while the magnifier tool is not active (precision gesture is disabled). This allows for precise framing the area of the data set that the user wants to interact with.

Step 802 is for determining if the magnifier tool is not active. If the magnifier tool is not active then step 804 or if the magnifier tool is active then step 806.

Step 804 is for changing the main view amplification (zoom level). Next step 808.

The next part of the method defines the behavior to change the magnification level of the magnifier tool by pinching in or pinching out of the screen while the magnifier tool is active (precision gesture enabled). This allows fine tuning the magnifier tool to best fit the user interaction.

Step 806 is for changing the magnifier tool amplification by scaling the highlight area. Such scaling will result in changing the magnifier tool amplification.

Step 808 is the end of pinch method 800.

FIG. 9 is an example screen shot of the preferred embodiment detailing the magnifier tool and magnification area; the graphic decorations; and the highlight area.

FIG. 10 is an example screen shot of the preferred embodiment identifying a magnifier tool display of FIG. 9 without any decoration.

FIG. 11 is an example screen shot of the preferred embodiment identifying a highlight area of FIG. 9.

FIG. 12 is an example screen shot of the preferred embodiment identifying a crosshair and element highlight of FIG. 9.

FIG. 13 is an example screen shot of the preferred embodiment identifying graphic decorations of FIG. 9.

Figure 14:
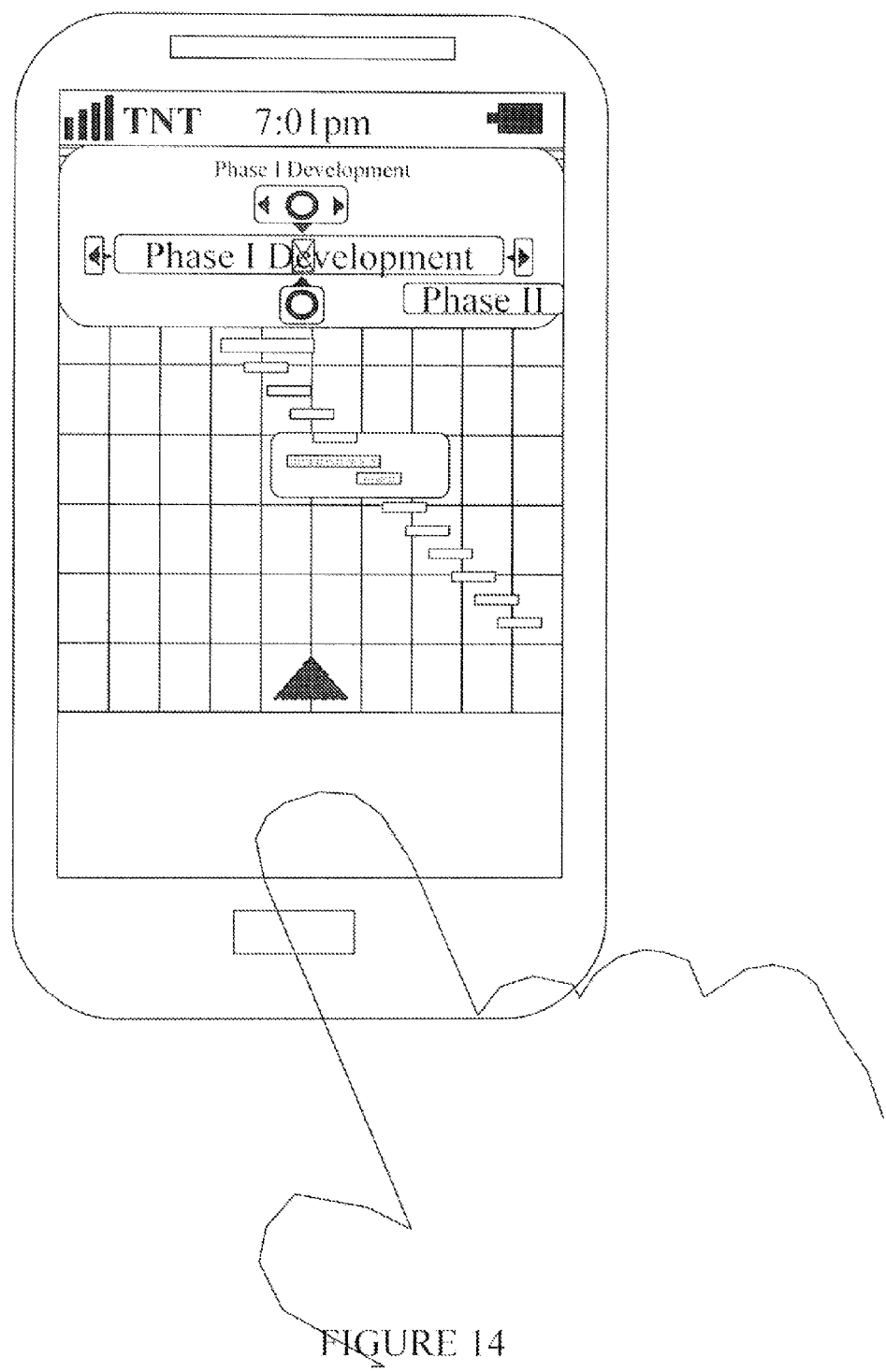
FIG. 14 is an example screen shot of the preferred embodiment illustrating a user moving a highlighted area too close to the magnifying tool.

FIG. 14 is an example screen shot of the preferred embodiment illustrating a user moving a highlighted area towards the magnifying tool.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

Figure 15:
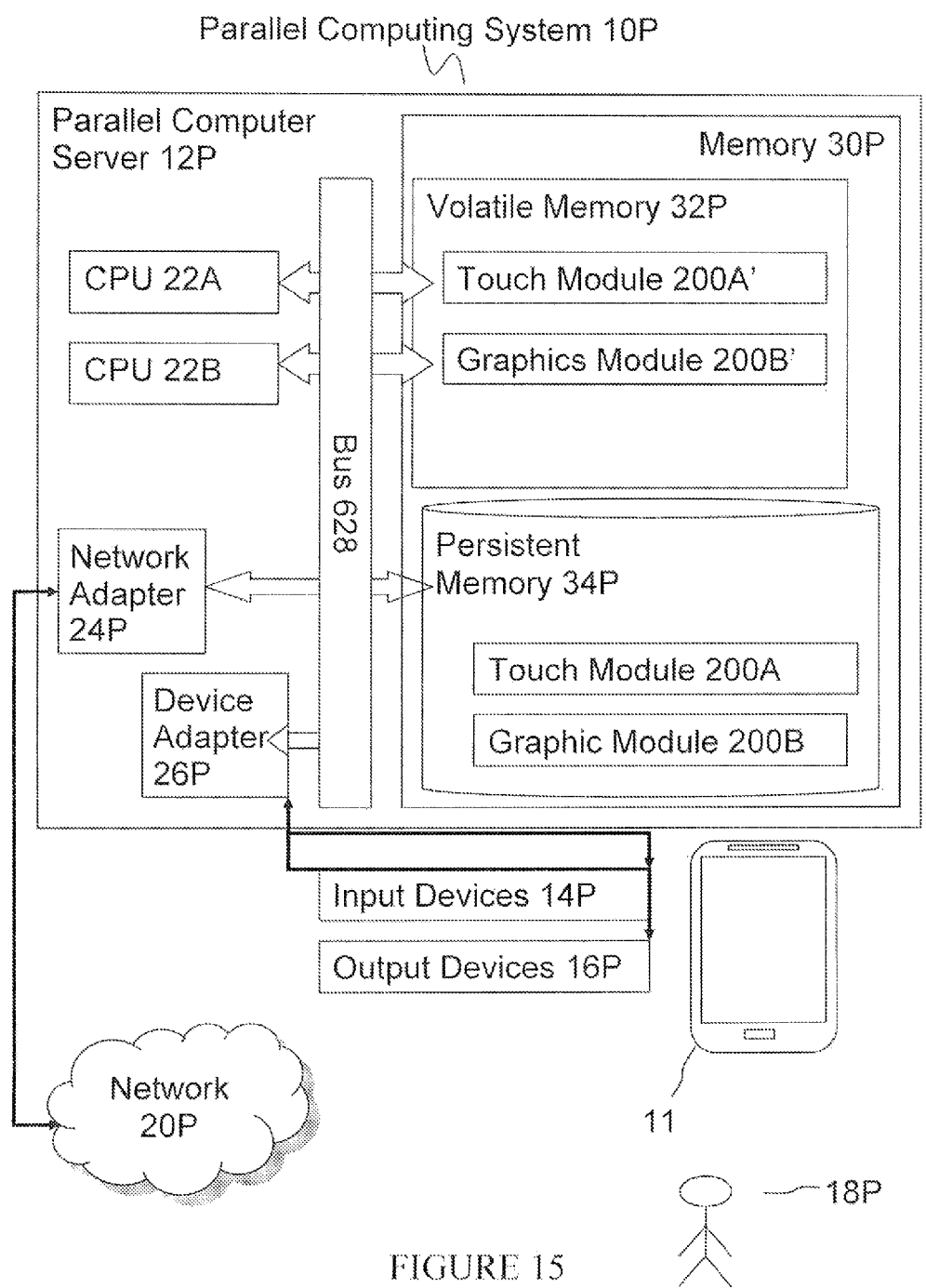
FIG. 15 is a deployment diagram of a parallel computing embodiment.

Referring to FIG. 15, an example parallel computing embodiment is described comprising parallel sets of comprises parallel computing system 10P for parallel processing of instructions. Parallel computing system 10P may be described in the general context of parallel computer system executable instructions, such as parallel program modules, being executed by parallel computing system 10P. Generally, parallel program modules may include routines, programs, objects, components, logic, data structures, that perform particular tasks or implement particular abstract data types. Parallel computing system 10P comprises: parallel computer server 12P; input devices 14P; and output devices 16P. Parallel computing system 10P communicates with user 18P via input devices 14P and output devices 16P. User 18P provides input and receives output from the parallel computing system 10P but is not part of parallel computing system 10P. Network 20P provides access to network attached devices and is not part of the parallel computing system 10P.

Parallel computer server 12P comprises: CPU 22A, CPU 22B; network adapter 24P; device adapter 26P; bus 28P and memory 30P.

Device adapter 26P provides the gateway between the parallel computer server 12P, input devices 14P and output devices 16P.

Bus 28P represents one or more of any of several types of bus structures, including a memory bus or memory controller, a peripheral bus, an accelerated graphics port, and a processor or local bus using any of a variety of bus architectures.

Memory 30P includes computer system readable media in the form of volatile memory 32P (such as random access memory and cache memory (not shown)) and in the form of non-volatile or persistent memory 34P.

In parallel computing embodiment, program modules comprise touch module 200A and graphics module 200B. Touch module 200A comprises the input functionality of the module 200 of the preferred embodiment. Graphics module 200B comprises the output or graphics functionality of module 200 of the preferred embodiment. Modules 200A and module 200B are stored in persistent memory 34P, by way of example and not limitation, as well as an operating system, one or more application programs, a database management system and other program modules. Each of the operating system, one or more application programs, other program modules, and program data or some combination thereof, may include an implementation of a networking environment. Module 200A and 200B are provided to carry out the functions and/or methodologies of the embodiments in a parallel environment as described herein.

Modules 200A and 200B are two autonomous parts of the embodiment. In operation, these two parts are extracted from persistent memory 34P and loaded into volatile memory 32P as modules 200A' and 200B' so that they may be executed separately and therefore in parallel by respective CPU 22A and CPU 22B.

In this example, two CPUs are shown but, three or more CPUs can be used to build alternative parallel embodiments. In this example, two separate CPUs are used but a single processing unit having multiple cores could be used to build an alternative embodiment. In this example, the CPUs are physical CPUs. CPU 22B may be a specialized graphics processor for performing graphical processing. In the described parallel computing embodiment the parallel computer server 12P comprises multiple processing units. In an alternative parallel computing embodiment, a parallel computer server comprises a single processor having multiple cores. In a first virtual parallel computing embodiment, a computer server comprises a virtual computing environment and virtual parallel processing units could be used to build a virtual parallel computing embodiment. A computer server comprises a virtual computing environment having a virtual processing unit with multiple virtual cores. Further embodiments can comprises combinations of: real processing units; real processing unit cores; virtual processing units; and virtual parallel processing cores.

As described herein In a first aspect of the invention there is provided a graphical processor comprising: a display tool for displaying a screen view of a data image including one or more graphical objects; a magnifier tool for displaying a zoomed-in view of a portion of the screen view superimposed on the screen view whereby the zoomed-in view remains turned on until turned off by the user; a crosshair tool for targeting a graphical object in the zoomed-in portion of the view; and a decoration tool for displaying a user control for the targeted graphical object.

One preferred embodiment is for a portable device screen with touch input but it is conceivable that monitor and laptop screens would see improvements using the concepts described here. Other input methods may be used such as mouse, keyboard or pen input.

The zoomed-in view remains visible until explicitly dismissed, allowing the user to pan (i.e., move a display left/right, up/down, etc.) the main view or interact with objects. Unlike prior art magnified views that disappear when the user lifts a finger, the zoomed-in view in this solution remains visible even while the user interacts with graphic objects.

An advantage of this solution is that it allows for continued interaction with a graphic object that is too small to be accurately manipulated in an un-magnified view (whole view).

A crosshair and highlight is used in the magnified view to clearly indicate the graphic object that will receive a tap action in the highlight area of the un-zoomed view, even when the graphic object is barely noticeable in that view. The crosshair tool provides a crosshair sight in the zoom-in view; a user targets a graphical object when it aligns with the crosshair sight. Whatever object is targeted sets the context for the decoration tool and the displayed user controls.

The highlighting of the selected object provides useful feedback to the user especially for small objects. The highlighting maybe in the form of a border around the object or special attributes for the object such as flashing colors.

The embodiments aim to improve usability of large 2D visual models on a limited size device screen by defining an efficient way to combine whole view and zoomed view simultaneously, eliminating the need to repetitively switch between them. The embodiments can be applied in any scenario where the device screen is too small to fit the whole view.

In order to address the problems described herein, visual methods are combined into a solution that feels natural to users while delivers unique value. These methods are: the use of a magnifier tool to zoom-in on an area where the user wants to interact with; the use of a crosshair tool to identify the element of the visual model that will respond to user input; the use of graphic decorations to visually identify the different interactions supported by the elements of the visual model; and the use of input gestures to control the magnifier tool and any interactions that the visual elements might have.

A set of predefined input gestures control the activation and deactivation of the magnifier tool, its behavior and any available interactions of a given visual element. Once the magnifier tool is activated, it displays an amplified view of the area being interacted by the user, which allows proper identification of the elements being manipulated. Graphic decorations are attached to the visual element being manipulated to visually expose any available interactions. This allows the user to trigger and control interactions without the need to switch to a zoomed view. Combined, all these methods allow precision 2D interactions of highly compressed visual models without the need of constant and repetitive changes in the zoom level perspective.

The embodiments allow the magnified view to remain visible in order to let the user pan the main view or act on objects. Unlike a known magnifier that disappears when the user lifts his/her finger, the magnified view in these embodiments remains visible even while the user interacts with graphic objects.

The embodiments allow predictable interactivity of the un-zoomed view whereby tapping the highlight area will forward the action to the graphic object currently at the center of the magnifier tool (under a crosshair mark), yielding predictable and reproducible interactivity even when the graphic object is barely noticeable in the un-zoomed view.

Preferably the display tool is controllable for panning the screen view and the magnifier tool is independently controllable for panning the zoom-in view. Therefore the embodiments allow freedom to pan the magnified view as well as the overall view. Whereas known interactive displays allow panning of either the zoomed or un-zoomed view, but not both. The embodiments allow for panning zoomed and un-zoomed views while both are visible.

More preferably the magnifier tool continues to display the zoomed-in view after the screen view has panned away from the portion. In this scenario the magnifier tool keeps the zoomed-in portion active until deactivated by a user.

Even more preferably further targeting one or more graphical objects in the zoomed-in view and providing one or more interaction controls for the targeted objects.

Yet more preferably further comprising highlighting the targeted graphical object in the display.

Advantageously user control is displayed in the zoomed-in portion. This allows for multiple accurate interaction modes on a graphic object that is too small to be directly manipulated in the un-magnified view.

More advantageously the zoomed-in portion is displayed away from the targeted graphical object in the view.

Yet more advantageously the magnifier tool is controlled by touch events to zoom in or out. Such multi-touch events include thumb and finger pinch-in and pinch-out. Such controls are defined by the double tap method 400; touch-and-hold method 500; tap method 600; touch move method 700 and pinch method 800 of the preferred embodiment.

Still more advantageously the crosshair tool is enabled to trigger tool tips when hovering over a graphical object. Some 2D graphic representations support tool-tips that are small graphic decorations that temporarily appear over certain visible element of interest usually by hovering an input device pointer over it. This makes tool-tips hard to achieve on touch-based devices as the hover concept does not apply. Crosshair tool tip tool 218 supports tool-tip on touch-based devices by positioning the crosshair over any supported visual element; the tool-tip appears next to the object in the magnifier tool, which is where the user most likely looking at.

Suitably the magnifier tool is enabled to display a zoomed-in view that is not part of the current screen view. Since the crosshair is always at the center of the highlight area, it might be difficult (if not impossible) to position it in a way that the crosshair will be over a small visual element next to the edge of the main view. Off-screen highlight tool 222 is for allowing the zoomed-in portion to move partially off-screen to allow the crosshair to cover the entire visible area.

There are limits that prevent the user zooming in beyond the 1:1 level, or zooming out beyond a certain threshold that depends on the data set domain. Such limits are controlled by the zoom limit tool 216 of the preferred embodiment.

In a second aspect of the invention there is provided a graphical user interface method comprising: displaying a screen view of a data image including graphical objects; displaying a zoomed-in view of a portion of the screen view of the data image superimposed on the screen view whereby the zoomed-in view is turned on and remains on until turned off by user interaction; targeting and triggering the default action of a graphical object in the zoomed-in view; and displaying a user control for interaction with the targeted graphical object.

The tools and methods of the embodiments operate at the machine level of the computer and below any executing computer application.

The tools and methods of the embodiments result in a new reliable interface being made available and thereby allowing a user or computer application to operate the computer in a new way through the new interface.

The tools and methods of the embodiments provide an increase in the speed of interaction between a user and the computing device by keeping a zoom interface always. This way there is no processing lag while waiting for the computing device to open up the zoom interface again.

In a third aspect of the invention there is provided a computer program product for a touch screen device, the computer program product comprising a computer-readable storage medium having computer-readable program code embodied therewith and the computer-readable program code configured to perform the method(s) described and claimed herein.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a digital computer, comprising software code portions, when said program is run on a computer, for performing the method(s) described and/or claimed herein.

In a fifth aspect of the invention there is provided a data carrier aspect of the preferred embodiment that comprises functional computer data structures to, when loaded into a computer system and operated upon thereby, enable said computer system to perform all the steps of the method. A suitable data-carrier could be a solid-state memory, magnetic drive or optical disk. Channels for the transmission of data may likewise comprise storage media of all descriptions as well as signal-carrying media, such as wired or wireless signal-carrying media. That is, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be clear to one skilled in the art that many improvements and modifications can be made to the foregoing exemplary embodiment without departing from the scope of the present invention.

What is claimed is:

1. A graphical processor comprising:
    a display tool for displaying a screen view of a data image on a display, wherein the screen view includes one or more graphical objects;
    a magnifier tool for displaying a zoomed-in view of a portion of the screen view, wherein the zoomed-in view is superimposed on the screen view, and wherein the zoomed-in view remains turned on until turned off by the user, and wherein the magnifier tool is enabled to display a zoomed-in view that is not part of a current screen view;
    a crosshair tool for targeting a graphical object in the zoomed-in portion of the view; and
    a decoration tool for displaying a user control for a targeted graphical object.

2. The graphical processor according to claim 1, wherein the display tool controls a panning of the screen view, and wherein the magnifier tool is controlled independently of the panning of the screen view.

3. The graphical processor according to claim 2, wherein the magnifier tool continues to display the zoomed-in view after the screen view has panned away from the portion of the screen view.

4. The graphical processor according to claim 1, further comprising:
    a targeting tool for targeting one or more graphical objects in the zoomed-in view and providing one or more interaction controls for targeted graphical objects.

5. The graphical processor according to claim 1, further comprising:
    a highlighting tool for highlighting targeted graphical objects in the display.

6. The graphical processor according to claim 1, wherein the user control is displayed in the zoomed-in portion of the view.

7. The graphical processor according to claim 1, wherein a zoomed-in portion of the view is displayed away from a targeted graphical object in the screen view.

8. The graphical processor according to claim 1, wherein the magnifier tool is controlled by touch events to zoom in or out of the screen view.

9. The graphical processor according to claim 1, wherein the crosshair tool is enabled to trigger tool tips when hovering over a graphical object on the screen view.

10. A method comprising:
    displaying, by one or more processors, a screen view of a data image on a display, wherein the screen view includes one or more graphical objects;
    displaying, by one or more processors, a zoomed-in view of a portion of the screen view, wherein the zoomed-in view is superimposed on the screen view, and wherein the zoomed-in view remains turned on until turned off by the user, and wherein the zoomed-in view is not part of a current screen view;
    targeting, by one or more processors, a graphical object in the zoomed-in portion of the view; and displaying, by one or more processors, a user control for a targeted graphical object.

11. The method according to claim 10, further comprising:
panning the screen view to control a display of the screen view of the data image on the display; and
magnifying the zoomed-in view independently of said panning.

12. The method according to claim 11, further comprising:
continuing to display the zoomed-in view after a screen view has panned away from the portion of the screen view.

13. The method according to claim 10, further comprising:
targeting one or more graphical objects in the zoomed-in view; and
providing one or more interaction controls for targeted graphical objects in the zoomed-in view.

14. The method according to claim 13, further comprising:
highlighting the targeted graphical objects in the zoomed-in view.

15. The method according to claim 10, wherein the user control is displayed in the zoomed-in portion of the view.

16. The method according to claim 10, wherein the zoomed-in portion of the view is initially displayed away from a targeted graphical object in the screen view.

17. The method according to claim 10, wherein the zoomed-in view is controlled by touch events to zoom in or out.

18. A computer program product for controlling a graphical user interface, the computer program product comprising:
a non-transitory computer readable storage medium having stored and encoded thereon:
first program instructions executable by a processor to cause the processor to display a screen view of a data image on a display, wherein the screen view includes one or more graphical objects;
second program instructions executable by a processor to cause the processor to display a zoomed-in view of a portion of the screen view, wherein the zoomed-in view is superimposed on the screen view, and wherein the zoomed-in view remains turned on until turned off by the user, and wherein the zoomed-in view is not part of a current screen view;
third program instructions executable by a processor to cause the processor to target a graphical object in the zoomed-in portion of the view; and
fourth program instructions executable by a processor to cause the processor to display a user control for a targeted graphical object.

19. The computer program product according to claim 18, further comprising:
fifth program instructions executable by a processor to cause the processor to pan the screen view to control a display of the screen view of the data image on the display; and
sixth program instructions executable by a processor to cause the processor to magnify the zoomed-in view independently of said panning.

* * * * *